United States Patent [19]
Dyson

[11] Patent Number: 5,465,684
[45] Date of Patent: * Nov. 14, 1995

[54] HAY FEEDER FOR LIVESTOCK

[76] Inventor: Karen Dyson, P.O. Box 279, Silver Lake, Ind. 46982

[*] Notice: The portion of the term of this patent subsequent to Aug. 16, 2011, has been disclaimed.

[21] Appl. No.: 288,482

[22] Filed: Aug. 10, 1994

Related U.S. Application Data

[63] Continuation of Ser. No. 144,346, Nov. 1, 1993, Pat. No. 5,337,699.

[51] Int. Cl.⁶ .................................................. A01K 1/10
[52] U.S. Cl. .................................................. 119/60
[58] Field of Search .............................. 119/58, 59, 60

[56] References Cited

U.S. PATENT DOCUMENTS

| | | | |
|---|---|---|---|
| 3,020,881 | 2/1962 | Strom | 119/60 |
| 3,626,468 | 12/1971 | Hanson | 119/59 |
| 3,777,713 | 12/1973 | Deats | 119/60 |
| 3,851,624 | 12/1974 | Peak | 119/60 |
| 3,906,903 | 9/1975 | Vandewater | 119/60 |
| 3,913,529 | 10/1975 | Leigh, Jr. | 119/60 |
| 4,302,139 | 11/1981 | Malish | 119/60 X |
| 4,346,671 | 8/1982 | Wagner | 119/60 |
| 4,488,565 | 12/1984 | Smith | 135/100 |
| 4,706,609 | 11/1987 | Delichte | 119/60 |
| 5,127,368 | 7/1992 | Akins | 119/60 |
| 5,158,040 | 10/1992 | Martin | 119/60 |
| 5,337,699 | 8/1994 | Dyson | 119/60 |

FOREIGN PATENT DOCUMENTS

| | | | |
|---|---|---|---|
| 2525070 | 10/1983 | France | 119/60 |
| 2598281 | 11/1987 | France | 119/60 |
| 1602111 | 11/1981 | United Kingdom | 119/60 |
| 2154418 | 9/1985 | United Kingdom | 119/60 |
| 2203322 | 10/1988 | United Kingdom | 119/60 |

*Primary Examiner*—Gene Mancene
*Assistant Examiner*—Thomas Price
*Attorney, Agent, or Firm*—Liell & McNeil

[57] ABSTRACT

A resiliently flexible hay feeder for livestock. The feeder is made from a flexible plastic material such as polyethylene so that the complete feeder responds to stresses with flexibility rather than rigidity. The feeder initially deforms but resiliently resumes its original shape when stressful forces are removed. The bale feeder also includes a plurality of bale centering springs attached around the peripheral edge of the feeder in order to maintain the hay a fixed distance away from the peripheral edge of the feeder and thus reduce waste by allowing hay that falls from an animal's mouth to return into the feeder to be eaten later, instead of being trampled and wasted. The feeder is made up of component parts which are assembled after shipment. This enables the feeder to not only be shipped at a reduced cost via parcel post but also permits a broken feeder to be easily repaired by simply replacing the broken piece with a new piece.

16 Claims, 3 Drawing Sheets

HAY FEEDER FOR LIVESTOCK

RELATION TO OTHER APPLICATION

This application is a continuation of U.S. patent. application Ser. No. 08/144,346, filed Nov. 1, 1993 by the same inventor, which has since issued as U.S. Pat. No. 5,337,699.

BACKGROUND OF THE INVENTION

This invention relates generally to a livestock feeder for use in dispensing hay to a group of animals, and more particularly to a hay feeder for cattle.

Livestock are typically fed during non-grazing months with stored hay. The hay is often stored in hay stacks, rectangular bales or in large cylindrical bales normally having a diameter on the order of about five to seven feet. When feeding, cattle tend to tear and pick at the hay in search of the choicest morsels. This often results in the less desirable portions of hay falling to the ground and becoming trampled by the cattle. Since cattle will not eat any hay which has become trampled, there is the potential for a large amount of waste from feeding cattle with stored hay.

In order to eliminate some of this potential waste, round bale feeders have long been known in the art. Although round feeders can be used with or can be sized for use with hay stacks and rectangular bales of hay, these feeders are more often designed to receive a single cylindrical bale of hay, which is confined within the bale feeder for access by a number of animals surrounding the feeder. The simplest feeders of this type typically include a plurality of circular rails which are connected to form a cylindrical body of a size to fit around the periphery of the bale. The connecting members typically comprise vertical or slanted bars so the animal can pass its head through the bars to reach the feed, but the bars are too close to allow the animal to actually climb into the feeder. In order to further limit waste, a sheet metal skirt is often provided from the lower most ring, which rests upon the ground, to a height on the order of 18 inches to assist in confining loose hay inside the feeder. While these prior art hay bale feeders are an improvement over simply allowing the cattle to feed from an unprotected hay stack or bale, they suffer from a number of significant draw backs.

Hay bale feeders are typically subjected to significant stresses, when being moved from one location to another, when being loaded with fresh hay and when being pushed around a feed lot by cattle seeking to obtain the last portions of the hay. In order to withstand such abuse, it has been the conventional wisdom in the art of hay bale feeders to confront these stresses by making the feeder as rigidly strong as possible. Nevertheless, prior art hay bale feeders eventually succumb to both the elements by rusting, and the repeated abuse by typically bending or breaking, with the consequence being that the feeder must be replaced.

In order to further eliminate hay waste, Delichte (U.S. Pat. No. 4,706,609) teaches a rigid hay bale feeder having an inner frame within which the cylindrical bale is confined, and an outer frame separated a fixed distance from the inner frame to prevent or to limit access to the hay bale by the animals. Some waste is eliminated because much of the hay that drops from the animal's mouth as it tears at the hay bale is dropped back into the feeder for later feeding instead of falling to the ground to be trampled and wasted. Delichte, however, suffers from a number of disadvantages due to its rigid design and structural form. Firstly, because of the rigid design, the hay bale is not held tightly within the inner frame because the inner frame must be sized to receive hay bales of different diameters. Another disadvantage that has long persisted in the art is the problems caused by the ring bar construction at the base of the feeder. As the animals feed, especially in the winter months, mud can freeze around the base ring of the bale feeder and make it difficult to break the feeder free from the ground without bending or breaking the feeder. Another problem encountered with the Delichte feeder is the inability to prevent over stressing of the framework when loading a heavy cylindrical bale into the feeder. In other words, the hay bale often becomes hung up on the inner frame when loading from the top. Like all other prior art bale feeders, the Delichte feeder eventually must be replaced due to rusting and breakage from repeated stressing.

Akins (U.S. Pat. No. 5,127,368) describes another rigidly constructed hay bale feeder having the waste eliminating features of Delichte, but in a construction that is more easily broken down into simpler parts for transport. While Akins can be broken down into more simpler parts than the Delichte hay feeder, it is still not suitable to be broken down sufficiently to qualify for shipment via parcel post. Furthermore the rigid structure of Akins suffers from the same ground freezing problems of the prior art and also results in a hay feeder that has difficulty withstanding the stresses encountered in the daily use of the feeder. Akins, like all other prior art rigid metallic feeders, suffers from another potential disadvantage during the winter months. During extreme cold months, livestock are sometimes injured when their tongues freeze to the metal structure of the feeder during feeding.

What is needed is a hay bale feeder that is relatively light yet robust enough to deal with the stresses or ordinary use without bending or breaking, is made from a corrosive resistant material that resists weathering, and has a structural form that overcomes the ground freezing problem.

SUMMARY OF THE INVENTION

In responding to this need, the present invention provides a resiliently flexible hay feeder comprising a cylindrical frame having a peripheral edge, an upper portion and a lower portion. The upper portion includes a plurality of openings large enough for the head and neck of an animal to pass through, and the lower portion is a cylindrical skirt relatively impervious to hay. Means are attached to the cylindrical frame for maintaining a hay bale centered within the frame a fixed distance away from the peripheral edge. In this way, hay falling from the animal's mouth returns to the hay feeder to be eaten later rather than trampled on the ground as waste. In one aspect of the invention the cylindrical frame has a cross sectional shape that is sufficiently flexible that the shape can be significantly distorted by the application of a force, such as that caused by a feed animal, but the cylindrical frame resiliently resumes its cross sectional shape when the force is removed. Thus, the present invention yields to stress rather than attempting to overcome stress through rigid strength as has been the conventional wisdom in the prior art.

In another aspect of the invention the means for maintaining the hay bale away from the peripheral edge of the cylindrical frame is a plurality of bale centering springs attached in spaced apart relation around the cylindrical frame. The bale centering springs act to resiliently center and re-center the hay bale within the feeder, especially during the high stress period when the hay bale is being placed within the hay feeder. Again, the present invention teaches yielding to stress without sacrificing robustness rather than attempting to overcome stress through a rigid metallic structure as in the prior art.

Still another aspect of the invention is a cylindrical frame having a lower portion that includes a base that contacts the ground. The base includes inner and outer surfaces substantially parallel to the central axes of the cylindrical frame so that the feeder is free of surfaces that could catch and freeze in mud. This allows the feeder to be easily broken free from ground when being moved. This aspect of the invention helps prevent unnecessary damage, or possibly even destruction of the feeder that is often caused when the feeder is moved to a different location within a feed lot during winter months.

One object of the present invention is to provide a hay feeder which defies the conventional wisdom by responding to stress with flexibility rather than rigid strength as in the prior art.

Another object of the present invention is to provide a hay feeder that resiliently maintains a hay stack, rectangular bale or cylindrical bale of hay a fixed distance away from the peripheral edge of the feeder so that waste is reduced.

Still another object of the present invention is to provide a hay feeder that has a base that includes only vertical surfaces so that it can be easily broken free from frozen mud or the like.

Still another object of the present invention is to provide a hay feeder made from a non-metallic flexible material from which animals can feed during cold winter months without having their tongues freeze to the feeder during feeding.

Still another object of the present invention is to provide a hay feeder made up of interchangeable parts that allow the feeder to be easily repaired by simply removing and replacing the broken part. In other words, a feeder free of welded connections.

Another object of the present invention is to provide a hay feeder whose diameter can be changed to suit a particular size hay stack, a different diameter cylindrical bale, or a larger rectangular bale of hay.

Another object of the present invention is to make a recyclable feeder which is itself made from recycled plastics.

Still another object of the present invention is to provide an improved hay feeder for livestock.

DETAILED DESCRIPTION

Figure 1:
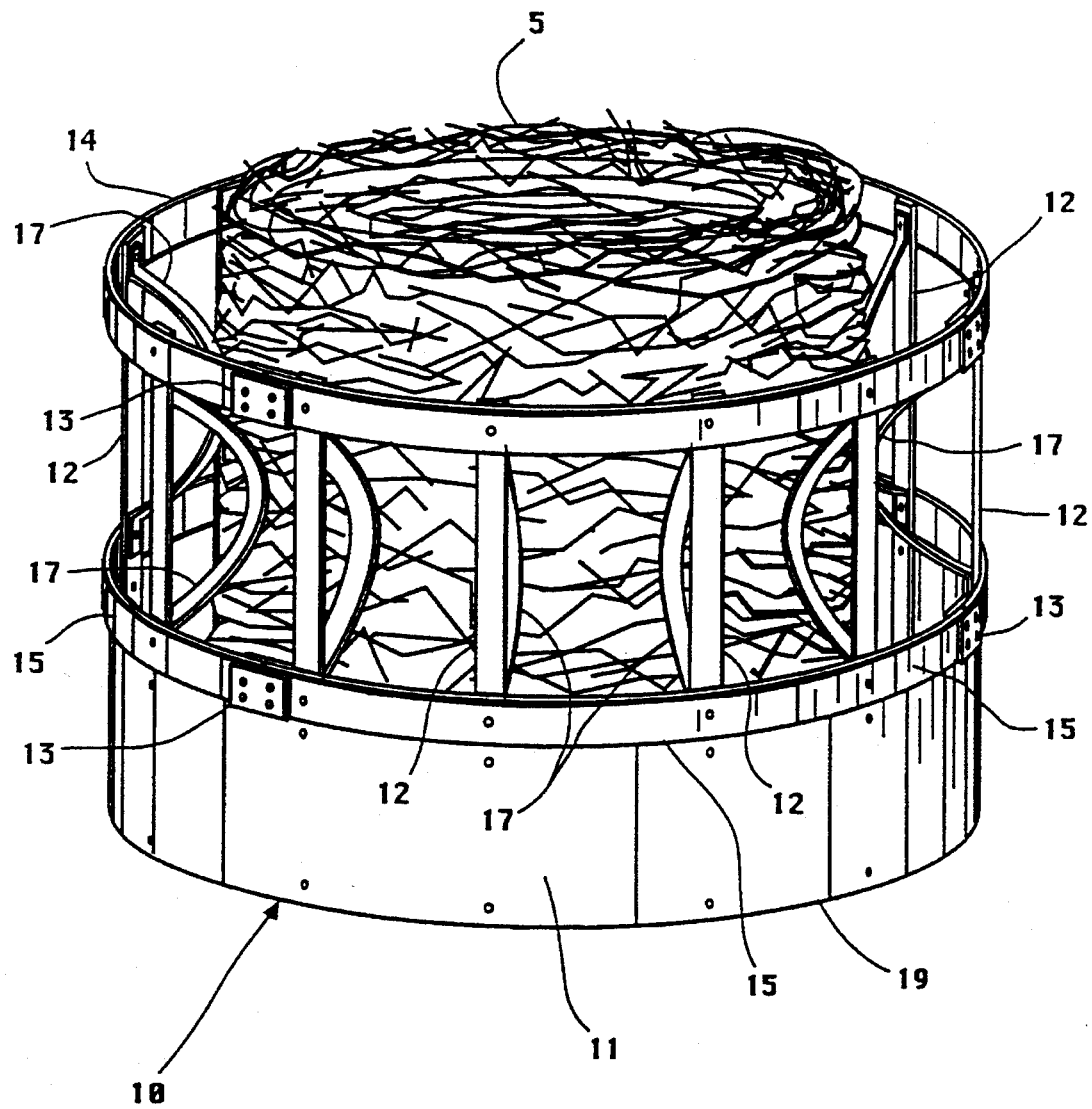
FIG. 1 is a perspective view of a hay feeder according to the preferred embodiment of the present invention.

Referring now to FIG. 1, there is shown a cylindrical bale of hay 5 positioned within a hay bale feeder 10 according to the preferred embodiment of the present invention. While the present invention is illustrated for use with large cylindrical bales of hay, this is for illustrative purposes only; the feeder is also suitable for use with hay stacks as well as rectangular shaped bales of hay. The bale feeder includes a cylindrical frame with a plurality of bale centering springs 17 attached around the peripheral edge of the feeder. Bale center springs 17 are made from smooth and flexible plastic slats which are attached at their ends to bow inwardly toward the center of the bale feeder. Slats 17 maintain the hay bale 5 a fixed distance from the peripheral edge of the hay feeder, which distance is preferably about 9 inches.

The cylindrical frame of bale feeder 10 is made up of upper and lower circular rings 14 and 15, respectively. In the preferred embodiment, the upper ring 14 is made from three 1"×4" polyethylene boards attached to one another via flexible mounting plates 13 with ordinary bolts. The area between rings 14 and 15 constitutes the upper portion of the cylindrical frame. The lower ring 15 is identical in structure to ring 14. Rings 14 and 15 are interconnected by a plurality of upstanding vertical slats 12, which are similarly preferably made from polyethylene or polypropylene boards. Rings 14 and 15 are simply bolted to upright slats 12 using conventional bolts, washers and nuts. The lower portion of the cylindrical frame is made up of a skirting 11 which is formed by rolling a sheet of polyethylene sheeting to the diameter of the feeder. Skirting 11 is attached to each upright slat 12 at its top and bottom as indicated in FIG. 1. Skirting 11 is preferably on the order of 18 inches high (12 inches high for calf feeders) and about 3/16 of an inch in thickness. Skirting 11 is shown solid but need only be relatively impervious to hay so that hay is kept within the feeder and the hay is kept relatively unsoiled so that the fallen hay will eventually be eaten.

Figure 2:
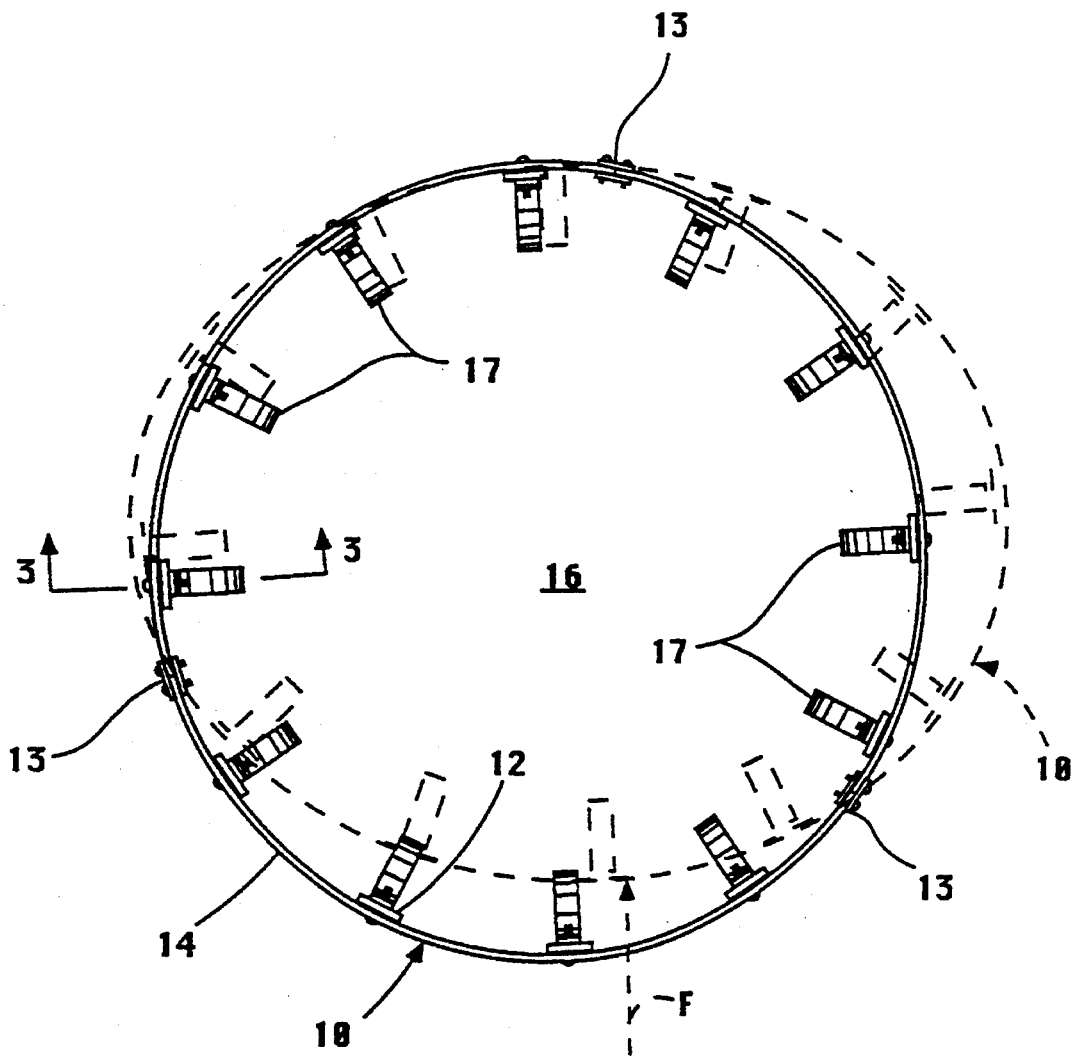
FIG. 2 is a top plan view of a feeder according to the present invention demonstrating the flexible nature of the feeder.

Apart from the necessary fasteners (nuts and bolts, for instance), bale feeder 10 is constructed completely from flexible pieces of plastic, and preferably from polyethylene. This construction gives the bale feeder robustness without sacrificing on strength. Furthermore, the polyethylene preferably includes ultraviolet inhibitors so that the feeder is not damaged by exposure to sunlight. Bale feeder 10 normally has a circular cross sectional shape as shown in FIG. 2 but, because of its flexible construction, can easily be deformed significantly from the circular cross section to an oblong shape as shown by the application of force F in FIG. 2. Thus, contrary to the conventional wisdom of responding to stresses on the feeder with brute rigid strength, the present feeder simply deforms under the action of the force and then resiliently resumes its original shape after the force is removed. FIG. 2 also shows that the circumference of the cylindrical frame remains constant when undergoing deformation. This flexibility gives the present feeder numerous advantages over prior art rigid feeders. First, the feeder can withstand the high stresses encountered when a heavy bale of hay is placed in the feeder by simply deforming and then resiliently resuming its circular cross section with the bale centering springs 17 first deforming and then resiliently resuming their shape to center the bale in the center of the bale feeder. Furthermore, the flexibility feature allows an animal to press up against the feeder to gain access to the last portions of a bale laying in the center of the feeder. The feeder can also be moved about in a feed lot, as well as to and from storage without risk of being permanently bent or broken. Finally, the present invention reduces injuries to livestock since their tongues will not freeze to the plastic material of the present invention during cold winter months as they would to the metal feeders of the prior art.

Figure 3:
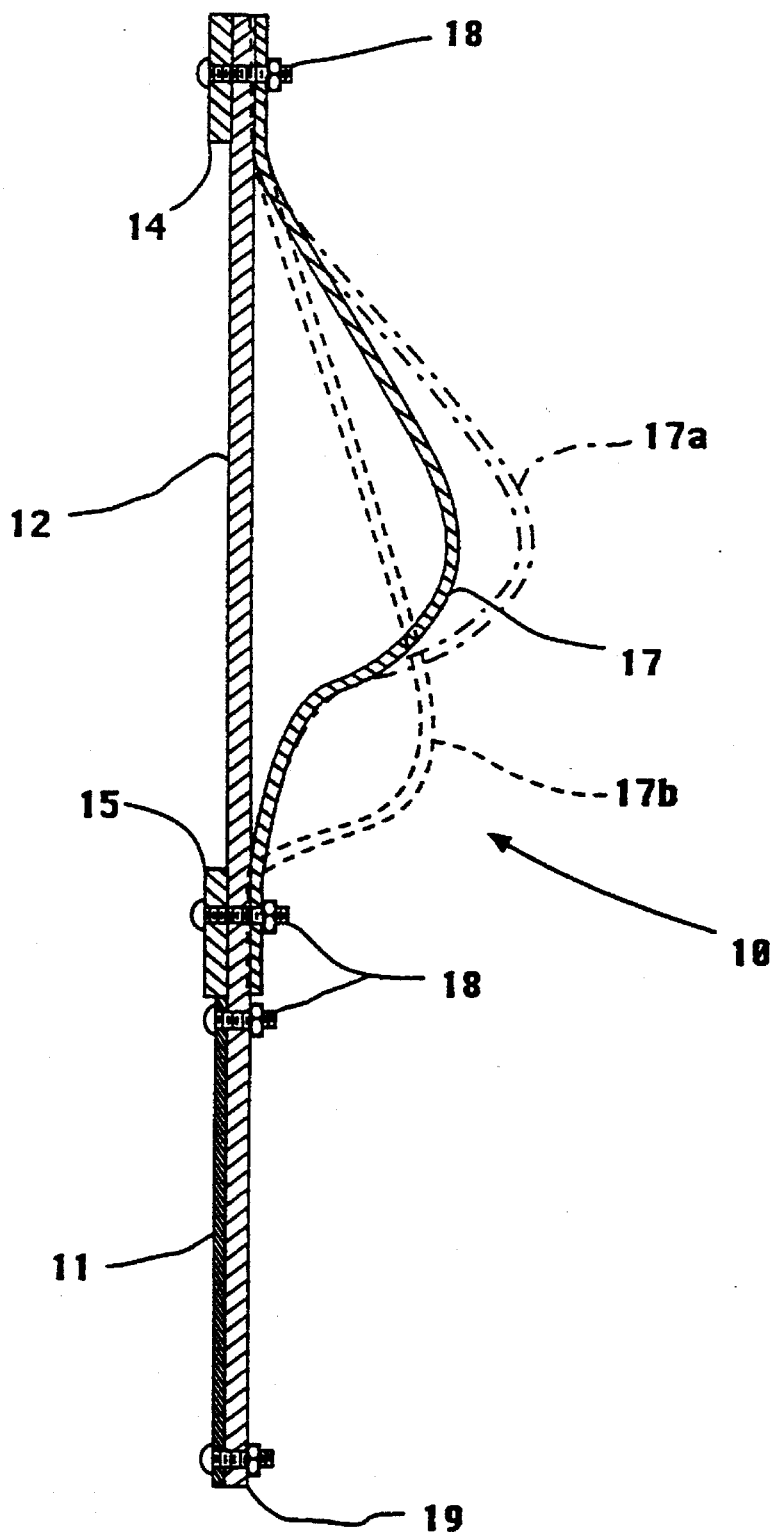
FIG. 3 is a side sectional view of taken along section lines 3—3 of FIG. 2.

FIG. 3 illustrates in better detail the precise cross sectional shape of bale feeder 10. In particular, upright slats 12 extend from the base 19 of the hay feeder all the way to the top. Rings 14 and 15 are simply bolted to each slat 12 around the periphery of the feeder. Likewise, skirt 11 is attached to each upright slat 12 with its own bolts 18 as shown in FIG. 3. Each bale centering spring 17 is attached at its ends to slats 12 and rings 14 and 15 via bolts 18. The flexible nature of the bale centering springs allows then to deform as shown at 17b when the hay bale is being placed into the feeder or when a force is acting on the side of the feeder as shown in FIG. 2. The smoothness of the polyethylene construction also aids in avoiding overstress problems associated with the prior art. When a force is removed, bale centering springs 17 resiliently resume their original shape to center and maintain the hay bale centered within the feeder at a fixed distance from the peripheral edge of the feeder, which is defined by rings 14 and 15. Bale centering springs 17 can include a number of attachment holes to adjust the distance that the spring bows in toward the center of the hay bale feeder as shown at 17a in FIG. 3. This allows the hay bale feeder to be adjusted for various sized hay bales including but not limited to square bales, large and small hay stacks as well as cylindrical bales having different diameters. The bale centering springs are preferably cut in strips from half inch thick polyethylene sheeting.

FIG. 3 is also useful in illustrating another subtle yet very advantageous feature of the present invention. In particular, the base 19 of the hay feeder consists only of vertical inner and outer surfaces which enable the feeder to be easily broken free of frozen mud or other materials which often accumulate around the peripheral edge of a feeder during feeding, especially during winter months. In other words, the feeder is supported by a base 19 that is substantially free of non-vertical surfaces that could become stuck in mud. Prior art rigid feeders, on the other hand, invariably include a stiffener ring or corrugated skirting at the base of the hay feeder in order to provide rigidity. An often encountered problem of prior art feeders is that the base becomes frozen in mud and the hay feeder is destroyed when it is broken free of the ground to be relocated within the feed lot.

Referring back to FIG. 1, another important advantageous feature of the present invention is the shape of each individual feed opening defined by the upper and lower rings 14 and 15, and adjacent upright slats 12. In the case of an adult animal feeder, this opening is typically on the order of 15 1/2 inches wide but is only on the order of 8 inches wide in the case of a calf feeder. Furthermore, upright slats 12 are preferably on the order of 54 inches high in the case of an adult animal feeder and on the order of approximately 42 inches high in the case of a calf feeder. The initially square opening on the outer peripheral edge of the feeder is narrowed in wedge like fashion at the feeding level of the animal by the inwardly bowed bale centering springs 17. The outer square opening is large enough to permit only the head and neck of the animal to protrude through but is too small to allow the animal to actually climb into the bale feeder. The inwardly projecting bale centering springs 17 provide a significantly narrower feed area at the outer surface of the hay bale 5 so that the animal is restricted in the amount of hay it can actually tear free from the bale. In other words, bale center springs 17 also serve the function of preventing the animal from tearing too much hay from the bale with each mouthful. This ensures that less hay is pulled from the bale with each mouthful and therefore less hay is likely to fall from the animal's mouth as potential waste. Finally, any hay that does fall from the animal's mouth is returned into the feeder because of the separation distance from the hay bale to the outer peripheral edge of the feeder.

Another important advantage of the present invention is the ability of the hay feeder to be broken down easily into its individual components. Since each of the individual components were preferably cut from flat polyethylene stock, the complete feeder can be shipped in a broken down condition within the regulations for parcel post shipments. In other words, the present invention can be shipped with the United Parcel Service at a significantly reduced cost because it can be broken down into components having the size and weight suitable for parcel post shipments. This allows each feeder to be shipped at a cost which is a fraction of that possible with both the Akins and Delichte feeders described above. After receiving the shipment, the farmer merely follows the assembly instructions and bolts the complete feeder together as shown in FIG. 1. Another important advantage of this construction is that it allows each individual component to be easily replaced by simply unbolting a broken piece and reinstalling a new piece. Prior art bale feeders, on the other hand, are normally considered destroyed when one or more of the metal pieces is either permanently bent, broken or weld broken. Finally, the bale feeder of the present invention is preferably made from ultraviolet resistant polyethylene that can stand up to the elements for years longer than that possible with corrosive metal feeders of the prior art.

It is important to note that the invention has been illustrated as an adult feeder for cylindrical bales as an example only. In the case of a calf feeder, upper and lower rings 14 and 15 are made up of two polyethylene boards attached end to end as opposed to three as shown in the FIGS. 1 and 2. This results in the calf feeder being typically on the order of about 5 feet in diameter. The smaller diameter calf feeder can be easily expanded up to approximately 8 foot diameter similar to the adult feeders illustrated in the figures by adding a third board to upper and lower rings 14 and 15, in addition to adding or converting to a larger diameter skirt. Furthermore, in the case of the adult feeders illustrated in the figures, a fourth board can be added to upper and lower rings 14 and 15 in order to create a 10 foot diameter hay stack feeder. Thus, it is clear that the particular structure of the present feeder can be adapted to accommodate virtually any number of animals, any size or shape of bale and even can be used with hay stacks.

The present invention also has ecological advantages over the prior art metallic feeders in that it is preferably completely constructed from recycled polyethylene boards and sheeting. This also renders the feeder itself recyclable since its various component parts, apart from the metal bolts, can be simply ground up and re-extruded into new polyethylene boards and sheeting for reuse as another feeder or in some other application.

It should be clear that various modifications can be made to the present invention as herein above described and many apparently different embodiments of the same can be made within the spirit and scope of the claims without departing from the scope of the invention. It is intended that the above description serve only to aid in the understanding of the invention and is not intended to limit the legal scope of the patent which is described solely by the claims as set forth below.

I claim:

1. A hay feeder comprising:
   a cylindrical frame having a cross sectional shape with a substantially constant circumference, a peripheral edge, an upper portion and a lower portion, said upper portion including a plurality of openings large enough for the head and neck of an animal to pass through, said lower portion including a cylindrical skirt relatively impervious to hay; and deformable means, attached to said cylindrical frame, for resiliently maintaining hay positioned within said cylindrical frame away from said peripheral edge.

2. The hay feeder of claim 1, wherein said deforming means is a plurality of bale centering springs attached in spaced apart relation around said cylindrical frame.

3. The hay feeder of claim 2, wherein each of said bale centering springs is a flexible slat attached at its ends to said cylindrical frame such that a middle portion of said slat bows inward from said peripheral edge.

4. The hay feeder of claim 3, wherein said bale centering springs are made of flexible polyethylene.

5. The hay feeder of claim 1, wherein said cylindrical frame is supported by a base that is substantially free of non-vertical surfaces that could become stuck in mud.

6. A hay feeder comprising:

a cylindrical frame having a cross sectional shape with a substantially constant circumference, a peripheral edge, an upper portion and a lower portion, said upper portion including a plurality of openings large enough for the head and neck of an animal to pass through, said lower portion including a cylindrical skirt relatively impervious to hay; and said lower portion being supported by a base that is substantially free of non-vertical surfaces that could become stuck in mud.

7. The hay feeder of claim 6, wherein said cylindrical frame has a cross sectional shape and is sufficiently flexible that said cross sectional shape can be significantly distorted by the application of a force, but said cylindrical frame resiliently resumes said cross sectional shape when the force is removed.

8. The hay feeder of claim 6, further comprising means, attached to said cylindrical frame, for maintaining hay positioned within said cylindrical frame away from said peripheral edge.

9. The hay feeder of claim 8, wherein said maintaining means is a plurality of bale centering springs attached in spaced apart relation around said cylindrical frame.

10. The hay feeder of claim 9, wherein each of said bale centering springs is a flexible slat attached at its ends to said cylindrical frame such that a middle portion of said slat bows inward from said peripheral edge.

11. A hay feeder comprising:

a plurality of upright slats arranged a fixed distance apart from one another in a circle around a central axis;

an upper ring attached to said upright slats;

a lower ring attached to said upright slats below said upper ring;

said upright slats, said upper ring and said lower ring defining a cylindrical frame with a peripheral edge;

a cylindrical skirt attached to said upright slats and having a base in contact with the ground at least partially supporting the hay feeder; and means, attached to said cylindrical frame, for maintaining hay positioned within the hay feeder away from said peripheral edge.

12. The hay feeder of claim 11, wherein, said maintaining means is a plurality of bale centering springs attached to said upright slats.

13. The hay feeder of claim 12, wherein said bale centering springs are flexible slats attached at their ends to said upright slats such that a middle portion of said flexible slat bows inward from said peripheral edge.

14. The hay feeder of claim 11, wherein said upright slats, said upper ring, said lower ring, and said cylindrical skirt are made from pieces of flexible polyethylene deformed and attached to one another with a plurality of fasteners.

15. The hay feeder of claim 14 wherein said pieces are relatively flat.

16. A hay feeder comprising:

a plurality of upright members made of a flexible plastic material and arranged a fixed distance apart from one another in a circle around a central axis;

an upper ring made of a flexible plastic material and attached to said upright members;

a lower ring made of a flexible plastic material and attached to said upright members below said upper ring; and said upright members, said upper ring and said lower ring defining a cylindrical frame having a cross sectional shape and being sufficiently flexible that said cross sectional shape can be significantly distorted by the application of a force, but said cylindrical frame resiliently resuming said cross sectional shape when the force is removed.

* * * * *